United States Patent [19]

Falzone et al.

[11] Patent Number: 4,685,791
[45] Date of Patent: Aug. 11, 1987

[54] FILM CASSETTE

[75] Inventors: Timothy F. Falzone, Revere; Anthony J. Schettino, Arlington, both of Mass.

[73] Assignee: Polaroid Corporation, Cambridge, Mass.

[21] Appl. No.: 820,020

[22] Filed: Jan. 21, 1986

[51] Int. Cl.⁴ .............................................. G03B 17/26
[52] U.S. Cl. ...................................... 354/277; 354/86
[58] Field of Search .................... 354/84, 85, 86, 174, 354/178, 180, 276, 277

[56] References Cited

U.S. PATENT DOCUMENTS

| | | | |
|---|---|---|---|
| 3,607,279 | 7/1971 | Gold | 354/276 |
| 3,707,116 | 12/1972 | Gold | 354/180 |
| 3,748,984 | 7/1973 | Gold | 354/277 |
| 3,821,049 | 6/1974 | Gold | 156/73 |
| 3,874,875 | 1/1975 | Land | |
| 4,172,650 | 10/1979 | Duncan | 354/212 |
| 4,201,457 | 5/1980 | Erlichman | 354/86 |
| 4,226,519 | 10/1980 | Gervais et al. | 354/174 |
| 4,492,445 | 1/1985 | Norris | 354/180 |
| 4,525,729 | 6/1985 | Agulnek et al. | 346/154 |

Primary Examiner—A. A. Mathews
Attorney, Agent, or Firm—Leslie J. Payne

[57] ABSTRACT

There is disclosed a film box for storing and dispensing film units of the self-developing type. This cassette includes referencing structure which insures correct positioning of a film hold-back finger and establishes a labyrinth type light seal for preventing actinic radiation therepast.

5 Claims, 7 Drawing Figures

FILM CASSETTE

BACKGROUND OF THE INVENTION

This invention relates generally to containers which store and dispense film units of the self-developing type.

Self-developing film units of the kind used in instant photography are typically housed in a film pack cassette having a yieldable supporting platform for supporting a stack of such film units. Representative examples of these kinds of film packs or assemblages are disclosed generally in U.S. Pat. Nos.: 3,821,049; 3,707,116; 3,607,279; 3,874,875; 4,172,650; 4,201,457; 4,226,519; and 4,492,445 which are assigned in common herewith. The supporting platform, in general, urges each of the topmost units against the interior of a top wall defining an exposure aperture of the cassette. Included is a removable dark slide which covers the exposure aperture to prevent fogging of the film units prior to insertion of the pack into the camera. After the dark slide is removed, the top film unit may be exposed. Following exposure a camera pick mechanism serves to advance the film unit exteriorly of the film cassette. Thereafter, the pressure applying rolls withdraw the film unit from the cassette and commence processing.

It is important that only a single film unit be dispensed from the film cassette following exposure. It is also important that actinic light be prevented from penetrating the cassette and fogging the film units.

In practice there are a number of cassette and camera features which are aimed at achieving these functions. In terms of the cassette, the leading end wall thereof is coupled hingedly thereto and movable upwardly to a closed position after the contents have been inserted. The top of this end wall in conjunction with the cassette top wall defines a film withdrawal slot which is located in operative relationship with respect to the topmost film unit. For attempting to prevent more than a single film unit from being withdrawn there is provided a hold-back finger. The hold-back finger is formed on the end wall and projects part way across the withdrawal slot so that its top surface defines a clearance which is intended to allow only a topmost film unit to be ejected.

For preventing actinic light from entering the cassette there is provided among other features a flexible light seal. The light seal tends to cover the exit slot, but can be displaced by an advancing film unit or dark slide which emerges from the cassette. The flexible light seal tends to prevent light from penetrating the slot and thereby fogging the film.

It is evident that it is extremely important that the hold-back finger be properly positioned to insure emergence of only a single film unit. Understandably, even relatively small variations in the proper positioning of the hold-back finger can result in the latter not serving to preform its intended functions.

Positioning problems can arise given the typical method of attaching the leading wall to the container or cassette body. More specifically the leading wall is usually bonded, as by ultrasonic welding, to the cassette body. Sometimes given the machine handling requirements of such welding there is a tendency for the hold-back finger to walk from its intended position. Thus mispositioning arises.

One attempt at sealing the end wall to the cassette body without welding is to rely upon a latching arrangement. In this approach there is provided a pair of latch posts or projections integrally formed on the cassette and arranged to cooperate with openings formed in adjacent ends of the leading end wall. The posts cooperate with these projections to position the hold-back finger. The positioning of the latch post in this known approach is arranged in such a manner that there exists a possibility that actinic light might enter the cassette body, thereby fogging the film units. With this latching arrangement, there is a possibility that the leading wall might be latched to the cassette body without properly positioning the hold-back finger.

SUMMARY OF THE INVENTION

The present invention is directed to a film pack which is arranged to overcome shortcomings mentioned above as well as provide certain improvements.

In accordance with this invention the film pack is of the type for use in photographic apparatus of the self-developing type. Included is a film cassette assembly having a space which can store a stack of film units of the self-developing kind. An exposure aperture is provided in the top wall and in operative relationship with each of the successive topmost film units of the stack. In this manner the photosensitive areas of each successive topmost unit can be exposed. End wall means is provided for defining an exit slot. The exit slot is in adjoining cooperative relationship with each topmost film unit for allowing ejection of such units. For yieldably supporting the stack a spring means is provided so that successive topmost units are urged into registry with the exposure aperture. Provision is made for film stop means on the end wall means for defining a clearance or effective opening of the exit slot which permits only a single film unit to be ejected therethrough. There is provided means for attaching the end wall means to the cassette and for controlling positioning of the film stop means so as to establish said clearance.

In an illustrated embodiment, the attaching and positioning means also provides a labyrinth type light seal for preventing actinic radiation from striking the photosensitive areas of the housed units.

Among the other objects and features of the present invention is the provision for an improved film pack of the type housing self-developing film units; the provision of a film pack having a cassette with a leading end wall thereof having an arrangement for establishing and controlling the clearance of a slot from which the film units are ejected; the provision of an improved apparatus of the foregoing type wherein the same structure which achieves the noted positioning, also prevents actinic radiation from striking the photosensitive area; and the provision of an improved apparatus of the foregoing type in which a labyrinth light seal is established to inhibit actinic radiation from the cassette interior.

Other objects and further scope of applicability of the present invention will become apparent from the detailed description to follow when taken in conjunction with the accompanying drawings in which like parts are designated by like reference numerals.

DETAILED DESCRIPTION

Figure 1:
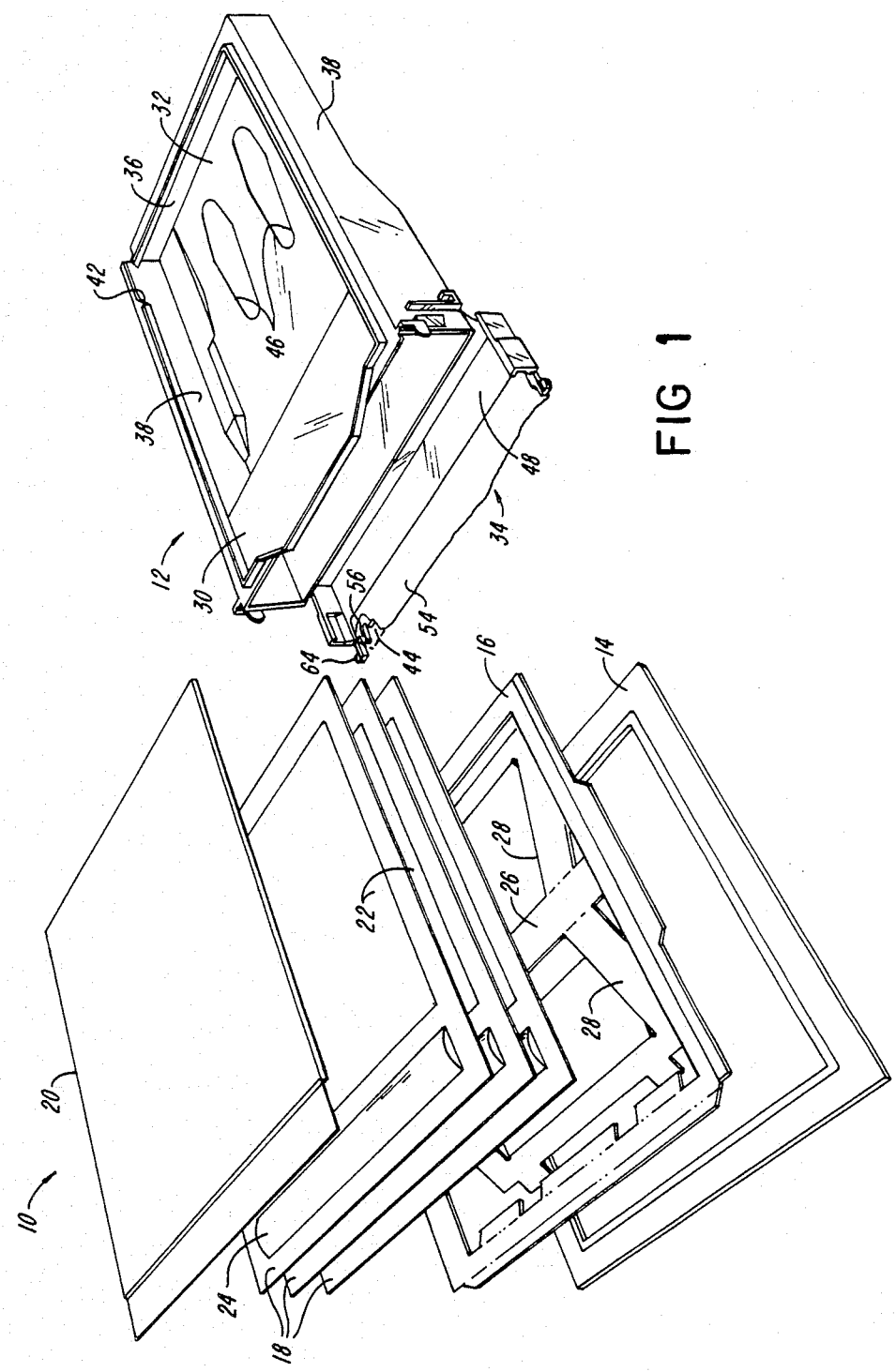
FIG. 1 is an exploded perspective view of a film cassette embodying the principles of the present invention together with the photographic contents which are to be placed in the cassette.

Referring to FIG. 1 there is disclosed a film pack or assemblage 10 of the type which is to be inserted into a self-developing camera (not shown). Basically, the film pack 10 includes a film box or cassette assembly 12 that is adapted to receive a generally planar electrical battery 14, a spring platen or pack spring 16, a plurality of film units 18 and a dark slide 20.

Initially referring to the film units 18 they are of the self-developing kind. Each includes an image-forming area 22 bordered by a frame having a rupturable pod 25 of processing fluid disposed along a leading marginal edge thereof. Each film unit 18 is adapted to be processed following exposure by the camera in a well known manner. Toward this end each topmost unit is advanced to and between a pair of pressure-applying spread rollers (not shown). The pod 24 is ruptured and the processing liquid is spread between and contacts both the positive and image receiving elements of the film units. This serves to initiate the diffusion transfer process, whereby the latent images on the film are developed.

The battery 14 is positioned beneath the stack of film units 18. Disposed between the electric battery 14 and the stack of film units 18 is the pack spring 16. The pack spring 16 is a yieldable spring which serves as a supporting platform for the film units 18. The pack spring 16 is intended to feed successive topmost units to a focal plane defined by the film cassette 12. Additionally, the pack spring 16 facilitates holding the battery 14 in the latter's position. This insures a more positive engagement between the battery and the camera's electrical components. The pack spring 16 is an integral spring steel body provided with a generally elongated supporting frame. Extending in splayed relationship from a central supporting bar 26 are two pairs of yieldable supporting legs 28 which provide the necessary spring force for achieving the functions heretofore noted.

Positioned in overlying relationship to the topmost film unit is the dark slide 20. The dark slide 20 is dimensioned to cover the photosensitive area 22 of the topmost film unit as well prevent light from passing through the cassette aperture. Therefore, the dark slide 20 serves to prevent exposure of the film units 18 prior to insertion of the film cassette 12 in the camera.

Figure 2:
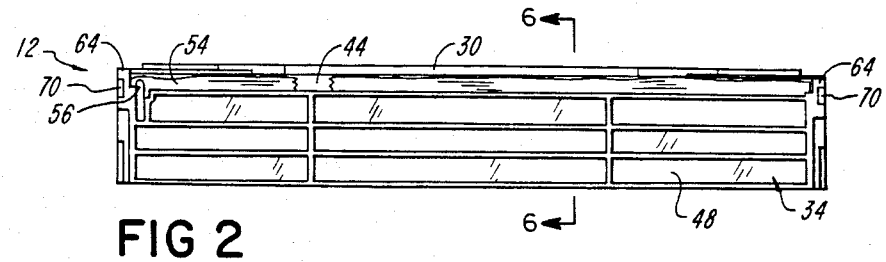
FIG. 2 is an enlarged end view of the film cassette made in accordance with the present invention.

Reference is now made to the film cassette or box 12. The film cassette 12 has a generally parallepiped structure and is made of a suitable opaque plastic material. The parallelpiped structure includes a top wall 30, bottom wall 32, leading end wall assembly 34, rearward wall 36 and side walls 38. The top wall 30 defines the generally rectangular light exposure aperture 40 which is designed to be in registry with the image forming area 22 of successive topmost units. The film pack 10 is constructed to fit within a camera of the instant developing kind, whereby each film unit 18 is presented at the aperture 40 so that they are in effect at the focal plane of the lens system. In this manner, scene images directed by the camera's focal system will be focused on the image forming areas 22. The top wall 30 also defines an elongated recess or cut-out 42 which is designed to facilitate a camera picking mechanism (not shown) pushing each topmost film unit 18 through an exit opening 44 (FIG. 2). A part of the light seal member 54 is broken away to better show exit opening 44.

The bottom wall 32 of the cassette 12 is formed with a pair of openings 46 through which electrical contacts of the camera are adapted to extend and make contact with the under side of the battery 14.

Figure 7:
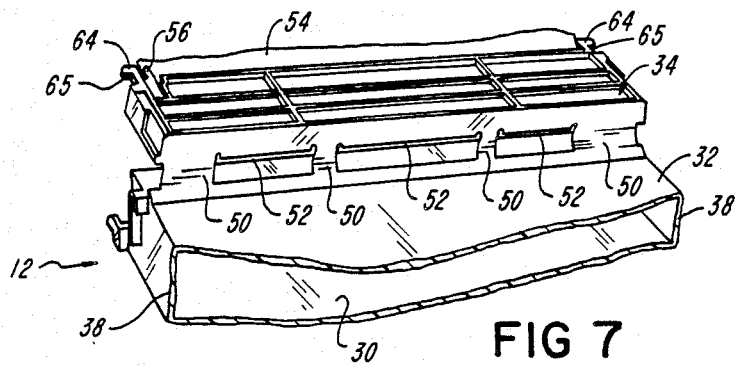
FIG. 7 is a partial perspective view of the bottom of the cassette showing the leading wall in the open condition.

The leading end wall assembly 34 is adapted to have a latching interfit with the side walls of the film cassette 12. Towards this end the leading end wall assembly 34 includes a hinged leading end wall 48 and a plurality of linearly spaced flexible hinges 50; see FIG. 7. Each hinge 50 has one end attached to the leading end wall 48 and the other end attached to the underside of the bottom wall 32. Positioned between each hinge 50 is a light deflecting protrusion 52 which is constructed to intimately engage the bottom wall for limiting actinic radiation from leaking to the inside of the cassette 12. The leading end wall 48 has ribbed protrusions for strength purposes.

A generally flexible and light opaque sealing member 54 is adhesively bonded to the interior surface of the end wall 48 and is constructed and arranged to limit light from entering the withdrawal slot 44. The light seal member 54 can be displaced when the dark slide 20 or the film units 18 emerge from the withdrawal slot 44. The end wall 48, when moved to its closed orientation (FIG. 3), defines the film exit slot 44.

Integrally formed on the end wall 48 is a film stop means. In this embodiment it is defined by an upwardly standing hold-back finger 56 which effectively limits the gap or clearance of the exit slot 44 such that a single film unit 18 can only pass therethrough. To reduce manufacturing tolerance problems between the finger 56 and the interior surface of the top wall 30, it is found helpful to make the hold-back finger somewhat resilient. In this manner it can bend outwardly in response to a film unit 18 passing through an exit slot 44. The resiliency is enhanced by virtue of cut-outs or slots positioned adjacent the hold-back finger 56.

Figure 3:
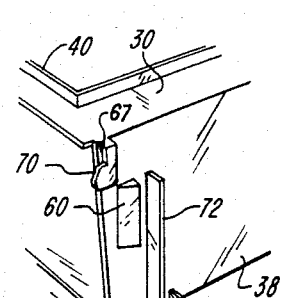
FIG. 3 is a partial perspective view of the leading wall of the cassette in the open condition.

The leading end wall 48 has a latching fit with the side walls 38 of the cassette 12. Each side wall 38 is formed with a camming projection 60 such as shown in FIGS. 1 and 3. Each camming projection 60 is arranged to cooperate with an inwardly directed latching lip 62 formed on opposite ends of the end wall 48.

As best shown in FIG. 3, extending along the opposite end portions of the end wall 48 is the upwardly extending guiding finger 64. Each finger 64 has the structure and configuration shown on the drawings. More specifically, the guiding finger 64 has recesses 65 with top and bottom shoulders 66 and 68; respectively. The top and bottom shoulders 66 and 68 are adapted to have a closed interfitting relationship with respect to corresponding top and bottom surfaces of a latching post 70. Each latching post 70 is integrally formed with the cassette and laterally offset from the side walls 38. The top surface of each latch post 70 is tapered so as to facilitate the guiding finger 64 fitting over the latch post 70 in a manner which will be described. More specifically, the guiding fingers 64, when the end wall 48 is pivoted upwardly, will have the recess 65 register with the latch post 70. In this embodiment, the latch post 70 is molded so as to be positioned in a manner that whenever the guiding finger 64 rests thereon the hold-back finger 56 is positioned at its intended location. As noted, it is intended to have a close interfitting relationship with the latch post 70 and the top and bottom surfaces 66,68 of the recess 65. Should the top surface 66 not rest upon the latch post 70 there would not be established the desired hold-back finger gap. However, the inherent resiliency of the hinges 50 biases the end wall 48 downwardly whereupon the top surface 66 rests on the top of the latch post 70. This insures establishment of the predetermined clearance or gap for the exit slot 44.

Significantly, because the latch post 70 is laterally offset from the side wall 38 when the recess 65 of the guiding finger 64 cooperates therewith, there is established a labyrinth type of light seal. Such seal inhibits greatly actinic radiation from entering the cassette 12.

Figure 4:
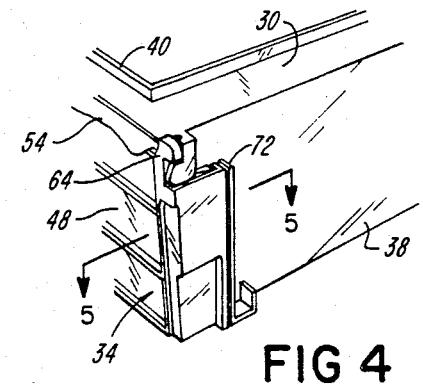
FIG. 4 is a partial perspective of the leading wall in a closed position.
Figure 5:
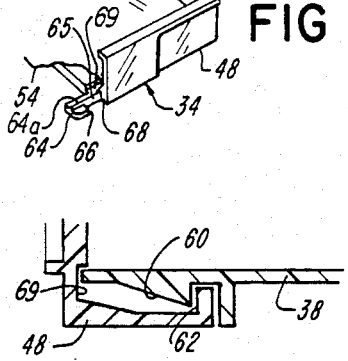
FIG. 5 is a cross-section view taken along section line 5—5 in FIG. 4.
Figure 6:
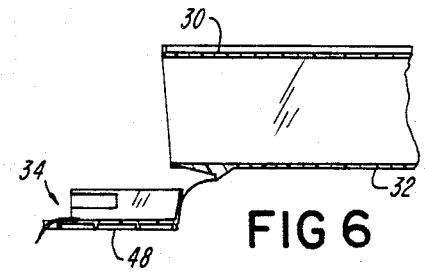
FIG. 6 is a cross-sectional view looking in the direction of the arrows along section line 6—6 in FIG. 2.

Additionally formed on the side walls 38 the film cassette are vertically extending ribs 72. The ribs 72 are adapted to be positioned adjacent the camming projections whereby when the leading wall 48 is in its latched position they will be closely positioned relative to the ends of such walls as shown in FIG. 4. The ribs 72 also function to inhibit actinic radiation from leaking into the cassette. Also, the ribs 72 prevent a user from prying the latch and thereby opening the leading wall and thus, possibly exposing the film units to light.

From the foregoing it is evident that there has been disclosed a film cassette or box which receives and supports a plurality of photographic contents including a stacked array of film units. The cassette is arrangeed so as to position the leading wall of a container in a proper orientation so that the stop means integrally formed therewith can be relatively precisely positioned and at the same time and provide a labyrinth type seal which minimizes greatly the likelihood that scene or sunlight are able to enter the interior of the cassette 12.

Since certain changes may be made in the above-described system and method without departing from the scope of the invention herein involved, it is intended that all matter contained in the description or shown in the accompanying drawing shall be interpreted as illustrative and not in a limiting sense.

What is claimed is:

1. A film cassette of the type usable as part of a film pack for storing a stack of film units of the self-developing type usable with a photographic apparatus, said cassette comprising:

a housing defining an open end;

first means hingedly attached to said housing and movable to a closed position for closing said open end so as to define in cooperation with said housing an exit slot in operative relationship to each successive topmost film unit of the stack, said slot having a vertical clearance which allows ejection of only single units, said first means including biasing means;

second means including a camming projection on and offset laterally from each side wall of said housing for mechanically coupling said first means to said housing, and a reference surface on and offset laterally from each of said side walls;

said biasing means for biasing said first means into contact with said reference surfaces when said first means is in said closed position so as to insure establishing said clearance; and, said reference surfaces, said first means and said camming projections providing labyrinth light seals inhibiting actinic radiation from leaking therepast into said housing.

2. A film cassette of the type usable as part of a film pack for storing a stack of film units of the self-developing type usable with a photographic apparatus, said cassette comprising:

a housing defining an open end;

means hingedly attached to said housing and movable to a closed position for closing said open end so as to define in cooperation with said housing an exit slot in operative relationship to each topmost film unit of the stack, said slot having a vertical clearance which allows ejection therethrough of only single units;

means on side walls of said housing for mechanically coupling said closing means to said housing in said closed position; and, means for controlling vertical positioning of said closing means so as to effectively control said vertical clearance, said controlling means including a reference member connected to and laterally offset from respective side walls of said housing, said controlling means including control surfaces on said closing means for cooperating with respective ones of said laterally offset reference members so that when said closing means is in said closed position, said reference members cooperate with corresponding ones of said control surfaces to establish said clearance, said control surfaces, said reference members and said coupling means cooperating to define labyrinth light seals which inhibit significantly actinic radiation from leaking therepast into said housing.

3. A film pack of the type for use in photographic apparatus of the self-developing type comprising:

a film cassette assembly having a space which can store a stack of film units, an aperture in operative relationship with successive topmost film units of the stack so that photosensitive areas of successive topmost units can be exposed, and end wall means defining an exit slot in adjoining operative relationship with successive topmost film units so as to allow ejection of exposed topmost units when in a closed position, said end wall means including a biasing means;

a stack of film units of the self-developing type wherein each includes a photosensitive area;

means for yieldably supporting said stack upwardly so that successive topmost units are urged into said operative relationship;

film stop means on said end wall means for establishing a clearance defining the effective opening of said exit slot so as to allow only successive topmost film units to be ejected through said slot; and, first means on side walls of said cassette assembly including a camming projection on and offset laterally from each side wall of said housing for mechanically coupling said end wall means to said cassette assembly, said first means including a reference surface on and offset laterally from each of said side walls, said biasing means for biasing said end wall means into contact with said reference surfaces when said end wall means is in said closed position, thereby positioning said film stop means relative to said cassette for establishing said clearance, said reference surfaces, said camming projections and said end wall means providing labyrinth light seals preventing actinic radiation from leaking therepast into said space.

4. The film pack of claim 3 further including a blocking projection, formed on each of said side walls and positioned adjacent said camming projections for assisting in preventing actinic radiation from entering said space.

5. A film cassette of the type for use in a film pack of the kind usable in photographic apparatus of the self-developing type, said cassette comprising:

a body defining a space which can store a stack of film units, an aperture in operative relationship with successive topmost film units of the stack so that photosensitive areas of successive topmost units can be exposed, and end wall means hingedly attached to said body and movable to a closed position for defining in conjunction with said body an exit slot in adjoining cooperative relationship with successive topmost film units so as to allow ejection of exposed topmost units;

film stop means on said end wall means for defining an effective opening of the exit slot when said end wall means is in said closed position so as to allow only successive topmost units to be ejected through said slot; and means on and laterally offset from side walls of said body for mechanically coupling said end wall means thereto and for controlling positioning of said film stop means when said end wall means is in said closed position so as to establish said effective opening, said laterally offset coupling and positioning means providing a labyrinth light seal arrangement for inhibiting actinic radiation from entering said space.

* * * * *